(No Model.)
E. THOMSON.
INDUCTION COIL FOR ELECTRIC METERS.
No. 482,209. Patented Sept. 6, 1892.
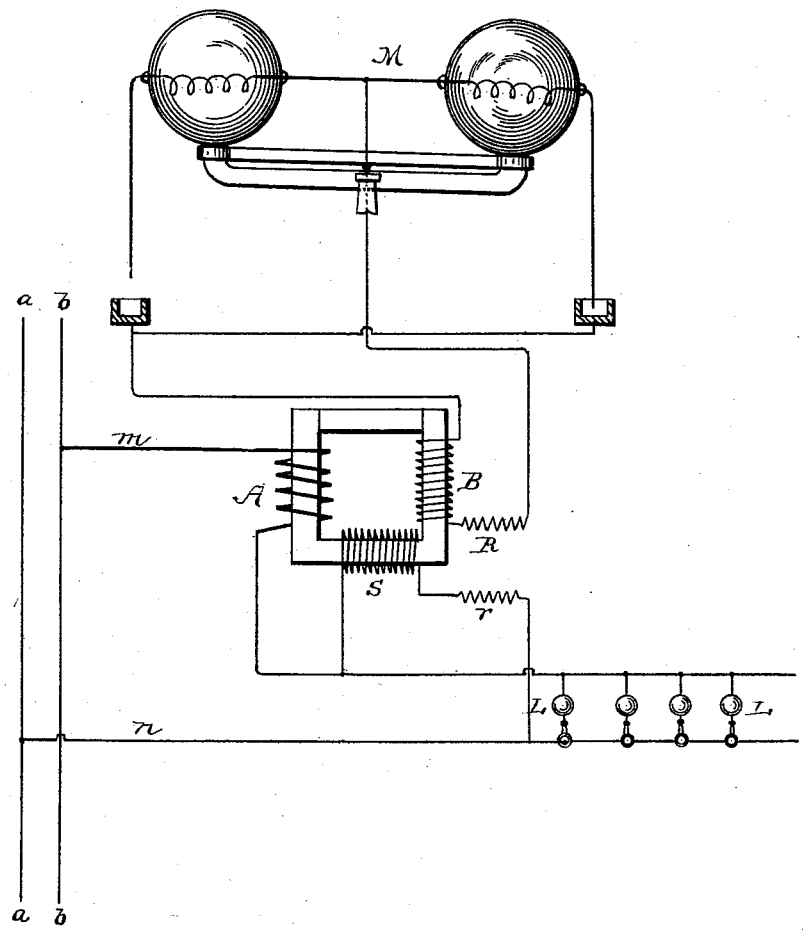
Witnesses
Ira R. Steward
Wm. H. Capel
Inventor
Elihu Thomson.
By his Attorney
H. C. Townsend

UNITED STATES PATENT OFFICE.

ELIHU THOMSON, OF LYNN, MASSACHUSETTS, ASSIGNOR TO THE THOMSON-HOUSTON ELECTRIC COMPANY, OF CONNECTICUT.

INDUCTION-COIL FOR ELECTRIC METERS.

SPECIFICATION forming part of Letters Patent No. 482,209, dated September 6, 1892.

Application filed March 5, 1889. Serial No. 301,910. (No model.)

*To all whom it may concern:*

Be it known that I, ELIHU THOMSON, a citizen of the United States, and a resident of Lynn, in the county of Essex and State of Massachusetts, have invented a certain new and useful Induction-Coil for Electric Meters, of which the following is a specification.

My invention relates to the means for determining the flow of current to an electric meter, the object being to obtain when desired a larger proportionate registry for a small than for a larger consumption.

A further object of the invention is to render the meter more sensitive and prompt to act when the current begins to flow in amount which it is desired should be measured by permitting or causing a current to flow in slight amount even when no registry is desired, thus giving to the meter what I term "initial energy."

My invention consists, essentially, in the provision of two coils or conductors, one in series with the work, or in a circuit where the flow of current is proportional to the current flowing in such series circuit, the other in derivation of preferably high resistance to the work, or in a circuit where the flow of current is proportional to the flow of current in such a derived circuit, and a third circuit or conductor inductively related to the other two and connected to a circuit which directly or indirectly furnishes current to or determines or governs the flow of current in the meter.

My invention is particularly designed for use with alternating-current circuits and is useful with meters such as described in my patents, Nos. 381,441, 381,442, and 381,443, as well as with other meters, when it is desired to obtain a registration of effects similar in character to those obtained by the use of my invention with the meters shown in my patents.

In the accompanying drawings I have illustrated my invention diagrammatically.

M is an electric meter of any desired construction, fed with current directly or indirectly from a coil or conductor B. The meter is in the present instance supposed to be capable of measuring or responding to alternating currents.

The variable work requiring the variable energy which is to be measured is represented at L L, &c., as a group of incandescent lamps supplied by mains $m\ n$, leading from a constant-potential circuit $a\ b$, which may be the secondary wires of a transformer or may run directly from an alternating-current dynamo or other source. The lamps or other devices have each a circuit-opening switch, as well understood in the art.

In the main circuit to the energy-users is a coil or conductor A, and in a derived circuit of high resistance across the main $m\ n$ is a coil or conductor S. The coil or conductor B is placed in inductive relation to both coils or conductors A S, so that the currents flowing both in the main circuit to the lights or other devices and in the branch around them may set up currents by induction on the separate meter-circuit. This may conveniently be accomplished by winding the coil B on the same iron core with A and with S, and preferably the coils are all wound on the same core.

Other forms of core might be used and the coils disposed thereon in any desired fashion, as well understood in the art, with relation to one another or to the core. The disposition shown is a good one, in which the strength of currents induced in B is considerably less than that flowing in A. The coils A S are so wound, applied, or connected that they will ordinarily tend to help one another in developing currents in the coil B. With this relation and with a proper relation of resistances when the amount of energy used is large the large current flowing in A will develop current in B and operate the meter in obvious manner; but as the consumption of energy lessens the main current lessens correspondingly. In the derived circuit, however, the flow of current does not correspondingly lessen; but the amount thereof, as compared to the number of translating devices in use, is proportionately greater than was the case with a larger number in use and a larger consequent consumption of energy. Hence the proportional current of registration will relatively increase as the current consumed decreases. Without the presence of coil S the reduction of flow in A to, say, one lamp or translating device or to very light load might result in no movement of the register at all. The coil S in circuit, however, around the point of consumption acts as a primary to induce currents in B, and thereby supply current which will operate the meter very slightly or with proper proportion of resistances and parts supply the same with a certain initial energy in the case when all of the translating devices are out of circuit. This latter is the preferable adjustment of the resistances and inductive actions, the purpose being to keep the meter supplied with initial energy to a sufficient extent to keep it just on the point of registering when there are no lamps or energy-users in operation.

In the operation of putting on load the registry per lamp will gradually diminish as the proportionate effect of S diminishes by the diminution of resistance at the work and by the superior inductive action of the coil A upon the core, the regulation being due, primarily, to the action of coil A, which increases until finally the effect of coil S is overcome. In fact, under heavy loads the heavy currents in A (the induced currents in B being then of considerable strength) may even set up currents in S, which will under such condition feed a current back to the mains through the resistance of $r$ and the coil itself.

By my present invention similar results to those obtained by the arrangements shown in my prior patent, No. 395,018, may be secured, the adjustments or relation of the elements being herein obviously capable of variation to produce in the meter all of the variations of action stated in said patent.

It is well to have the coil A of but few turns comparatively, so as not to introduce too much drop or loss of electro-motive force into the circuit running to the lights. The winding S or pressure-winding is of finer wire and more turns. The winding B can be of any number of turns and of such coarseness of wire as is suited to operate the meter M of either high or low electro-motive force. A rheostat may, if desired, be inserted in the meter-circuit, as at R, and also in the pressure-circuit, as at $r$, for adjusting the flow of current in each of these coils; but the desired resistance may also be obtained by constructing the coils themselves of metal—such as German silver—in whole or in part.

This invention has the advantage of keeping the meter-circuit separate from any other circuit, so that if an accident occurs to the meter or its circuit the feeding of the lamps is not necessarily interrupted, or if an excess of current comes upon the line the meter may escape injury, because it is not connected directly with the main or feeding circuit.

What I claim as my invention is—

1. The combination, with an electric meter, of coils or conductors tending to help one another and placed, respectively, in derivation to the work and in circuit with the work and a third coil or conductor inductively related to the other two and supplying the current which causes the operation of the meter, as and for the purpose described.

2. The combination, on the same iron core, of three coils, one of few turns carrying current in direct proportion to the current to be measured, a second carrying current in derivation to the work and tending to help the first, and a third connected to a separate circuit and being the seat of currents induced by the other two for operating upon the meter.

3. The combination, substantially as described, of three coils inductively related to one another and connected, respectively, as described, one into the main circuit with the work, a second into a derived circuit around the work and adapted to help the first, and a third into the circuit with an electric meter for measuring the current consumed in the work.

4. The combination, substantially as described, of a meter-circuit, a main-circuit coil in inductive relation to the same and in series with the work, and a helping high-resistance circuit in a branch around the work at the point of consumption and also in inductive relation to the meter-circuit, as and for the purpose described.

5. The combination, with constant-potential mains feeding a translating device or devices requiring a variable amount of energy, of a coil or conductor in the circuit through which the energy consumed passes, a helping coil or conductor of practically constant effect, and a separate meter-circuit in inductive relation to the first two, as and for the purpose described.

Signed at Lynn, in the county of Essex and State of Massachusetts, this 28th day of February, A. D. 1889.

ELIHU THOMSON.

Witnesses:
J. W. GIBBONEY,
A. L. ROHRER.